(12) United States Patent
Wieneke

(10) Patent No.: US 7,382,900 B2
(45) Date of Patent: Jun. 3, 2008

(54) METHOD OF DETERMINING A THREE-DIMENSIONAL VELOCITY FIELD IN A VOLUME

(75) Inventor: Bernhard Wieneke, Goettingen (DE)

(73) Assignee: LaVision GmbH, Goettingen (DE)

( * ) Notice: Subject to any disclaimer, the term of this patent is extended or adjusted under 35 U.S.C. 154(b) by 621 days.

(21) Appl. No.: 10/936,398

(22) Filed: Sep. 8, 2004

(65) Prior Publication Data

US 2005/0062954 A1 Mar. 24, 2005

(30) Foreign Application Priority Data

Sep. 18, 2003 (DE) ................ 103 43 160

(51) Int. Cl.
*G06K 9/00* (2006.01)
(52) U.S. Cl. ............... 382/107; 73/23.24; 356/27; 348/154
(58) Field of Classification Search ........... 382/100, 382/106, 107; 348/154, 155; 73/23.24, 488; 356/27, 28
See application file for complete search history.

(56) References Cited

U.S. PATENT DOCUMENTS

| 5,610,703 | A | | 3/1997 | Raffel et al. |
| 5,699,444 | A | | 12/1997 | Palm |
| 5,883,707 | A | | 3/1999 | Arndt et al. |
| 5,905,568 | A | * | 5/1999 | McDowell et al. ............ 356/28 |
| 6,088,098 | A | * | 7/2000 | Arndt et al. ................ 256/339 |
| 6,278,460 | B1 | * | 8/2001 | Myers et al. ................ 345/424 |
| 6,542,226 | B1 | * | 4/2003 | Wernet ...................... 356/28.5 |
| 6,789,039 | B1 | | 9/2004 | Krumm |
| 6,980,690 | B1 | * | 12/2005 | Taylor et al. ............... 382/154 |
| 6,990,228 | B1 | * | 1/2006 | Wiles et al. ................ 382/154 |
| 7,130,490 | B2 | | 10/2006 | Elder et al. |
| 7,257,237 | B1 | * | 8/2007 | Luck et al. ................. 382/102 |
| 2004/0183909 | A1 | | 9/2004 | Wieneke |
| 2004/0207652 | A1 | * | 10/2004 | Ratti et al. ................. 345/697 |

FOREIGN PATENT DOCUMENTS

| DE | 44 08 072 | 8/1995 |
| DE | 198 01 615 | 7/1999 |
| DE | 199 28 698 | 9/2000 |

(Continued)

OTHER PUBLICATIONS

U.S. Appl. No. 10/725,903, filed Dec. 1, 2003, Wieneke.

(Continued)

*Primary Examiner*—Bhavesh M. Mehta
*Assistant Examiner*—Anand Bhatnagar
(74) *Attorney, Agent, or Firm*—Jordan and Hamburg LLP

(57) ABSTRACT

A method of determining a three-dimensional velocity field in a volume having particles, the particles within the volume being excited to radiate by illuminating the volume, including two or more cameras simultaneously capturing images of the observation volume at two different instants of time, the observation volume being divided into small volume elements (voxels), each voxel being projected onto image points of the cameras, the intensity of all the voxels being reconstructed from the measured intensity of the respective associated image points, a plurality of voxels being combined to form an interrogation volume, and a displacement vector being determined by a three-dimensional cross correlation of the two interrogation volumes.

7 Claims, 1 Drawing Sheet

FOREIGN PATENT DOCUMENTS

DE    103 12 696  B3    12/2004

OTHER PUBLICATIONS

Bruecker CH: "Dual-Camera DPIV for flow studies past artificial heart valves", Spring 1997 Experiments in Fluids 22 496-506.

Jun. 16, 2000 A new easy camera calibration technique based on circular points Xiaoqiao Meng, Zhanyi Hu Pattern Recognition 36 1155-1164.

Aug. 1, 2001 Two-Axis Scheimpflug focusing for particle image velocimetry Stephen Walker Instrumentation in Aerospace Simulation Facilities, 2001. 19th International Congress on ICIASF 2001. 114-124.

* cited by examiner

METHOD OF DETERMINING A THREE-DIMENSIONAL VELOCITY FIELD IN A VOLUME

FIELD OF THE INVENTION

The invention relates to a method of determining a three-dimensional velocity field in a volume.

DESCRIPTION OF THE PRIOR ART

A standard method of measuring gas or liquid velocities consists in the Particle Image Velocimetry (PIV) method (DE 199 28 698 A1) by which the flow is seeded with small particles and a thin observation plane is usually illuminated twice in fast sequence by means of a laser and is image captured by a camera positioned normal to the observation plane, said camera being capable of taking a fast sequence of two images. These camera images are divided into small interrogation windows, said two interrogation windows being cross correlated at a location x, y with the two instants of time at which the image was captured in order to determine, through the highest correlation peak, the most probable (dx, dy)-displacement vector between the two interrogation windows. (dx, dy) thereby are the two displacement vector components normal to the observation direction of the camera. Velocity in the respective one of the interrogation windows is determined by dividing the displacement vector by the time difference dt. A two-dimensional velocity field having the two velocity components within the illuminated plane is thus obtained with a camera. This method is characterized in that it is relatively robust to image defects and intensity noise and to non-assignable particles which are for example particles that have left the light sheet.

The use of high speed cameras for carrying out PIV-methods is known from DE 44 08 072 A1.

DE 198 01 615 A1 describes a calibration method for PIV-methods for measuring flow processes.

All three velocity components can be determined by stereoscopic recombination of the displacements ($dx_1$, $dy_1$ and $dx_2$, $dy_2$) (stereo-PIV) (DE 199 28 698 A1) using two cameras. Appropriate calibration, e.g., using a calibration plate, is required for matching the two images and for determining the dependence of measured displacements ($dx_n$, $dy_n$) on the spatial displacements ($d_x$, $d_y$, $d_z$).

Alternatively, a system for measuring the flow components is known from U.S. Pat. No. 6,542,226 B1, one camera measuring the two in-plane flow components while the second camera measures the third flow component by calculating the Doppler shift across the light sheet plane.

Various methods have been developed for measuring a velocity field not only in a plane but in a larger sized volume. On the one hand, a light sheet can for example be rapidly displaced through a volume, using e.g., a rotating mirror, and several planes can be captured in a fast sequence using a suited high-speed camera. The fact that each plane has to be imaged twice imposes strong limitations on the time interval between the exposures and the number of planes that can be imaged. Using modern CMOS cameras capable of capturing e.g., high resolution images at 1 kHz and e.g., eight planes, a minimum dt of 8 msec is obtained which however is too long for many applications in which high speed flows are to be registered. Further, the planes are not imaged simultaneously but one after the other. The optical setup comprising mechanical parts is also quite complicated.

Alternatively, several planes may also be illuminated in fast sequence, with one camera being provided for each plane as this is described in U.S. Pat. No. 5,883,707.

Another method relies on imaging the complete volume employing two or more cameras at a time (U.S. Pat. No. 5,905,568). The location of the observed particles is found out in each camera image and the (x, y, z) position of the particles is determined by triangulation. A particle in image 1 lies on an epipolar line depending upon the depth z in the camera image 2. The velocity of the particles is determined from the position at different instants of time using an appropriate matching algorithm (3D Particle Tracking Velocimetry, 3D-PTV). Like with stereo PIV, accurate volume calibration of the cameras is necessary. The drawback of this method is that the density of the particles must be quite low since overlapping particles result in errors and since, during triangulation, too many possible particles lie on the epipolar lines, leading to non existing phantom particles.

A third method relies on holographic images using different optical systems. The particles are illuminated in fast sequence using two laser pulses and the hologram is stored on a photographic plate. Since the image plates must first be developed one by one and must be scanned at high expense using CCD cameras, this method is not suited for industrial applications which often need thousands of images in order to provide statistical evidence on the flow field.

BRIEF SUMMARY OF THE INVENTION

The following method of determining a three-dimensional velocity field in a volume is proposed to eliminate the above mentioned drawbacks.

It is also provided that the particles within the volume are excited to radiate by illuminating the volume. There are further provided at least two cameras that simultaneously capture an image at two different instants of time $t_1$, $t_2$ at least. The same voxel (volume element) at position (x, y, z) is thereby mapped from the volume onto the image plane by determining the projection equation in the camera image points ($x_n$, $y_n$) of the at least two cameras. Next, the intensities of the voxels along the line of sight on the camera image points ($x_n$, $y_n$) are measured at the at least two different instants of time $t_1$, $t_2$. The intensity of the voxel in the volume is reconstructed by recombining the intensities at the image points ($x_n$, $y_n$) corresponding to the voxels. For determining an interrogation volume having e.g., 32 by 32 by 32 voxels, the intensity of all the voxels is calculated at different instants of time $t_1$, $t_2$ according to the steps mentioned herein above. The displacement vector ($d_x$, $d_y$, $d_z$) in the observation volume between the two interrogation volumes at the instants of time $t_1$ and $t_2$ is determined by three-dimensional cross correlation so that a complete velocity field is thus obtained for the observation volume.

Put another way, this means that a volume element (voxel) of a predetermined size is first selected from a certain volume seeded with particles that are excited to radiate, said voxel being viewed from different angles by two cameras. At an instant of time $t_1$, each camera takes an image with the coordinates of the voxel within the volume that is viewed by the cameras being mapped onto the camera image points of the respective one of the cameras by the known projection equations at the instant of time $t_1$. The same is repeated at another instant of time $t_2$. Accordingly, the image plane of each camera contains a projection of the voxel at a certain instant of time and at a certain intensity. It has thereby to be taken into consideration that not only the intensity of a single voxel is projected on the image plane on the line of sight but that the intensities of all of the voxels along the line of sight in the illuminated volume are integrated onto the image point. The intensity of a voxel is now mathematically reconstructed from the intensity of the projected image points according to the teaching recited in the subordinate claims 3 and 5 or to similar tonographic reconstruction methods. Determining the intensity of a voxel is not yet sufficient to determine the three-dimensional velocity field. It is necessary to repeat this step and to thus determine the intensity of a plurality of voxels in the observation volume. At the respective instants of time $t_1$ and $t_2$, what is termed an interrogation volume is then calculated from a plurality of voxels having the corresponding intensities. Such an interrogation volume consists e.g., of 32 by 32 by 32 voxels. At the respective instants of time $t_1$ and $t_2$, the interrogation volume, which is determined by a plurality of voxels, has a certain intensity field. It is now possible to determine the displacement vector ($d_x$, $d_y$, $d_z$) by performing a three-dimensional cross correlation between the interrogation volumes at the instants of time $t_1$ and $t_2$, the displacement with the highest correlation coefficient accordingly constituting the most probable displacement between the two interrogation volumes at the instants of time $t_1$ and $t_2$. A displacement vector is computed for each interrogation volume in the observation volume in order to represent a 3D-velocity field.

The advantage of this method is that it is quite insensitive to overlapping particles in the respective camera images as it is not necessary to find the location of individual particles assuming a certain shape, like it is the case with 3D-PTV-methods, the displacement vector being computed with a fault-tolerant statistical correlation analysis instead. Erroneous voxel intensities are statistically averaged and are suppressed relative to the true correlation peak.

To determine the imaging parameters, the method makes accurate volume calibration a proviso, said calibration being usually computed from several views of a known calibration plate. Additionally, it is possible to determine the imaging parameters for the projection equation in part or in whole using self-calibration on the captured particle images. Both variants have already been disclosed in DE 103 12 696.1.

Further advantageous features and designs of the invention will become apparent in the subordinate claims.

There is more specifically provided that the grid selected for the interrogation volumes be equal to or finer than the equivalent pixel size of the cameras so that several voxels of an observation plane normal to two or more cameras equal the size of one pixel $x_n$, $y_n$ and that the intensity of the voxels be calculated from a subpixel accurate interpolation of the intensities of the camera image points $x_n$, $y_n$ of the cameras. This means that the voxels are to be smaller than the pixels of a camera so that it is made possible to more accurately determine the intensity of the voxels.

There is further provided that the intensities of the voxels be determined by the minimum of the intensities of the corresponding image points projected onto the cameras 10 and 30 (sec FIG. 2). As the image point may receive not only the intensity of the one voxel but also the intensities of other voxels along the line of sight, it is possible that the intensity of the image point be too high, whereas the corresponding image paint of the other camera receives the intensity of one voxel only, thus reproducing the real intensity. The minimum intensities of the image points of the two cameras obtained are hereby taken as a basis for further computation.

Another possibility to minimize as far as practicable such faults in determining the intensities consists in determining the intensities in a voxel by multiplicative algebraic reconstruction technique.

In an advantageous variant, the observation volume is illuminated e.g., in thin layers, less illuminated voxels then lying along a line of sight so that reconstruction of the voxel intensities is rendered more stable and more accurate while it is still possible to determine a velocity field with a great three-dimensional depth on the other side.

The invention will be understood better upon reading the exemplary description accompanying the drawing.

DETAILED DESCRIPTION OF THE INVENTION

Figure 1:
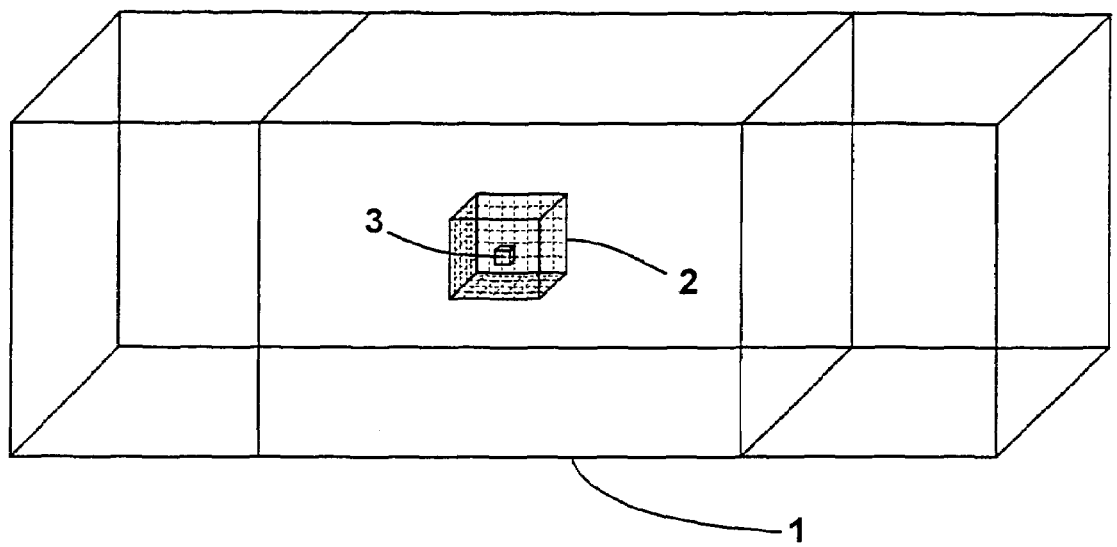
FIG. 1 illustrates a voxel 3 in an interrogation volume 2 in an observation volume 1.
Figure 2:
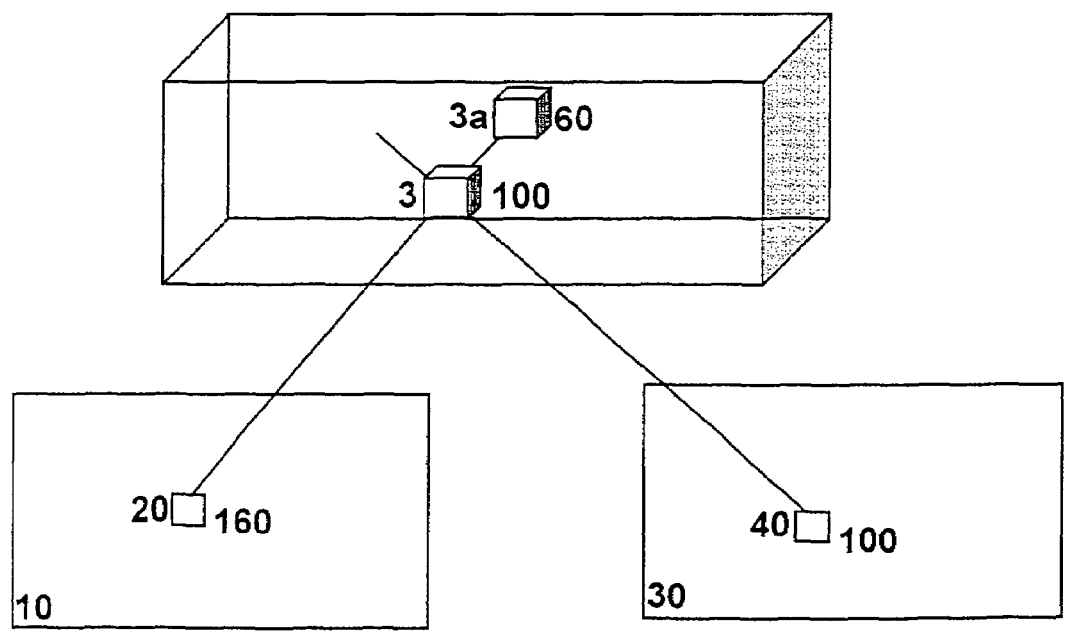
FIG. 2 schematically shows the problem of determining the real intensity of a voxel.

In the camera image of camera 10, the pixel 20 receives light from the volume elements (voxels) 3 and 3a at an overall intensity of 160 counts. In the camera image of camera 30, the pixel 40 receives light from volume element 3 only at an intensity of 100 counts. Upon reconstructing the voxel 3, the minimum intensities of the pixels 20 and 40 yield the right voxel intensity of 100 counts.

I claim:

1. A method of determining a three-dimensional velocity field in an observation volume including particles, the method including the steps of:
   exciting the particles to radiate by illuminating said volume;
   providing at least two cameras to simultaneously capture an image of the observation volume at at least two different instants of time;
   providing the observation volume on a grid which is divided into small volume elements (voxels);
   projecting each voxel at a location onto image points of the at least two cameras using a projection equation;
   measuring an intensity of respective ones of associated image points;
   reconstructing the intensity of all the voxels from the measured intensity of the respective ones of the associated image points;
   combining a plurality of voxels to form at at least two interrogation volumes; and
   determining displacement vectors at at least two times at a same location by a three-dimensional cross correlation of the two interrogation volumes.

2. The method in accordance with claim 1, wherein the grid is equal to or finer than an equivalent pixel size of the cameras so that several voxels of an observation plane normal to a view point vector of a respective one of said cameras is equal to the pixel size.

3. The method in accordance with claim 2, wherein the intensity of the voxels is calculated from a subpixel accurate interpolation of the intensities of the image points of the cameras.

4. The method in accordance with claim 1, wherein the intensities of a voxel at a location are determined by a minimum of the intensities of the projected points of the cameras.

5. The method in accordance with claim 4, wherein camera images are normalized using local camera sensitivities.

6. The method in accordance with claim 1, wherein the intensity of a voxel at a location is determined by a multiplicative algebraic reconstruction technique (MART).

7. The method in accordance with claim 1, wherein the observation volume is illuminated in parts only in several thin planes.

* * * * *